US006736968B2

(12) United States Patent

Mullins et al.

(10) Patent No.: US 6,736,968 B2

(45) Date of Patent: May 18, 2004

(54) HORIZONTAL SCROLL SCREEN CENTRIFUGE

(75) Inventors: Michael T. Mullins, Villa Hills, KY (US); James R. Rodebush, West Chester, OH (US)

(73) Assignee: Tema Systems, Inc., Cincinnati, OH (US)

(*) Notice: Subject to any disclaimer, the term of this patent is extended or adjusted under 35 U.S.C. 154(b) by 31 days.

(21) Appl. No.: 10/179,924

(22) Filed: Jun. 25, 2002

(65) Prior Publication Data

US 2003/0234214 A1 Dec. 25, 2003

(51) Int. Cl.[7] ........................ B01D 33/46; B01D 33/76; B04B 3/04

(52) U.S. Cl. .................... 210/232; 210/360.1; 210/374; 210/380.3

(58) Field of Search .............................. 210/232, 360.1, 210/369, 372–374, 380.3, 391, 396

(56) References Cited

U.S. PATENT DOCUMENTS 1,478,660 A * 12/1923 Barnes et al.
3,419,148 A * 12/1968 Niwa et al.
3,980,563 A * 9/1976 Greutert et al.
4,193,874 A * 3/1980 Gerteis
5,091,084 A * 2/1992 Krettek
5,378,364 A * 1/1995 Welling
5,380,434 A 1/1995 Paschedag
5,397,471 A 3/1995 Rodebush et al.
5,433,849 A * 7/1995 Zittel
5,468,389 A * 11/1995 Keller

FOREIGN PATENT DOCUMENTS

EP 0845296 * 6/1998

OTHER PUBLICATIONS

TEMA Systems, Inc., *Coal Centrifuges,* Product Brochure, 1993.

* cited by examiner

*Primary Examiner*—Fred G. Prince

(74) *Attorney, Agent, or Firm*—Wood, Herron & Evans, L.L.P.

(57) ABSTRACT

A horizontal centrifuge has a basket rotatably mounted within a housing. The basket has a plurality of rings disposed between open and closed ends of the basket and a plurality of guide rails circumferentially spaced with respect to the rings. The guide rails have respective lengths extending between the open and the closed ends of the basket and provide a plurality of respective bearing surfaces. A tubular screen is supported in the basket by the plurality of bearing surfaces of the guide rails. A scroll with helical screw flights is also rotatably mounted within the basket. In various aspects of the invention, the tubular screen is made from six arcuate screen segments; the bearing surfaces of the guide rods and the peripheral edges of the helical screw flights are machined surfaces; and the scroll is fabricated.

26 Claims, 5 Drawing Sheets

HORIZONTAL SCROLL SCREEN CENTRIFUGE

FIELD OF THE INVENTION

The present invention relates generally to the area of fluid handling and solid/liquid separation and, more particularly, to a horizontal scroll and screen centrifuge.

BACKGROUND OF THE INVENTION

It is well known to use a scroll and screen centrifuge to separate a crystalline, a granular or a fibrous product from a liquid in which the crystalline, granular or fibrous product is carried. Scroll and screen centrifuges are typically used with a continuous process in which a combined liquid and solid material is continuously fed into and continuously discharged from the centrifuge. The continuous process is distinguished from a batch process in which a batch of the liquid and solid material is fed into the centrifuge; and the liquid and solid materials are separated. The centrifuge is stopped, and the separated materials are removed before another batch is loaded into the centrifuge. Both the continuous and batch separation processes are also considered to dry the solid material. The separation process is used in a wide range of applications including the production of soap powders, coal, gypsum, plastic granules, potash, salt, etc.

In a typical horizontal scroll and screen centrifuge, a scroll and basket assembly is frustoconical, that is, shaped like a frustum, and is mounted for rotation within a housing with respect to a generally horizontal axis of rotation. A frustoconical scroll has a tubular side wall with outwardly projecting helical screw flights and rotates within an independently rotating frustoconical screen and basket assembly. The scroll rotates at a slightly different angular velocity from the screen and basket assembly, so that the helical screw flights on the scroll pass close to an inner directed surface of the screen. The helical length of the screw flights varies in a range of from about a fraction of a revolution to several revolutions around the scroll member. A liquid containing solids to be separated therefrom is fed into a closed rearward portion of the scroll and the rotations of the scroll and the screen and basket assembly produce a centrifugal force causing the liquid to pass through openings in the screen thereby separating the liquid from the solids. The rotational velocity difference between the scroll and the screen and basket assembly causes the screw flights to push the solid material across the screen from the smaller, closed, rear end of the scroll flights to the larger open, forward end of the scroll from which the solid material is discharged. The processing time or retention time of the material in the centrifuge is controlled by the pitch of the helical screw flights on the scroll and the difference in angular velocities between the scroll and the screen and basket assembly. Retention time can also be influenced by the design of the feed openings in the scroll. The solid particles pass from the centrifuge to another processing station, a conveyor or a collection unit.

Using a centrifuge to separate a liquid from a solid material in oil mud presents numerous challenges. First, the centrifuge must often be located on an oil derrick platform at sea. As will be appreciated, it is very important that the centrifuge be as small as possible to minimize its footprint and consume the least possible area on the platform.

Second, the solid material separated from the oil mud must be removed from the oil rig platform for proper disposal, either by hauling it inland or, if properly processed and reduced to a low enough moisture level, disposed of at sea. Therefore, it is desirable that the centrifuge be very efficient in order to minimize the quantity of liquid in the solid material.

Third, a centrifuge mounted on an oil rig platform is exposed to the elements, and therefore, the design of a centrifuge intended for use on an oil rig platform must be rugged to withstand extended exposure to the elements.

Fourth, unlike many other environments in which a centrifuge is located, an oil rig platform does not have a crane readily available to lift various components, for example, the scroll, when the centrifuge is being serviced or the screen is being changed. Therefore, it must be possible to perform all of the routine maintenance and service on the centrifuge without the need of an independent and separate crane.

Fifth, a centrifuge separating oil mud on an oil rig platform is subjected to long periods of continuing use and therefore, must operate very reliably between scheduled down times. Further, such a centrifuge must be price competitive with other liquid/solid separation equipment.

Thus, there is a need for a centrifuge that provides an improved performance and is particularly suitable for separating liquid and solids in oil mud on an oil rig platform.

SUMMARY OF THE INVENTION

The present invention provides a horizontal centrifuge having a relatively small footprint and very efficient in operation. Further, the horizontal centrifuge of the present invention includes a self-contained scroll removal tool and is especially useful for separating oil mud on an oil rig platform.

According to the principles of the present invention and in accordance with the described embodiments, the invention provides a horizontal centrifuge for separating oil mud into a liquid and a solid material. The centrifuge has a basket rotatably mounted within a housing. The basket has a plurality of rings disposed between open and closed ends of the basket and a plurality of guide rails are circumferentially spaced with respect to the rings. The guide rails have respective lengths extending between the open and the closed ends of the basket, and the guide rails provide a plurality of respective bearing surfaces. A tubular screen is supported in the basket by the plurality of bearing surfaces of the guide rails. A scroll is mounted within the basket to rotate about the axis of rotation relative to the basket. The scroll has a tubular side wall and a plurality of helical screw flights extending outwardly from the tubular side wall between outer and inner ends of the scroll. Each of the plurality of screw flights has an edge moving in close proximity and relative to an inner surface of the screen. The scroll further has a feed opening proximate the rear end of the tubular side wall, and an infeed tube with an outlet extending into the outer end of the scroll. The infeed tube directs oil mud into the rotating scroll and through the feed opening. The helical screw flights of the scroll carry solid material to a solid material exit while liquid passes through the rotating screen and basket to a liquid exit.

In one aspect of this invention the tubular screen is made from six arcuate screen segments joined together. Using six arcuate segments provides the screen with greater circularity and allows the screen to better conform to the bearing surfaces on the guide rails, thereby making the screen more concentric with the basket and the scroll. A retaining ring or clamp ring urges the screen against the bearing surfaces, which helps maintain the roundness of the screen. The greater concentricity permits the edges of the helical screw flights to be positioned more closely to the inner surface of the screen. The net result is that the centrifuge is more effective at separating the liquid from the solid material, thereby resulting in lesser volume of solid material that must be transported for proper disposal. In another aspect of this invention, the bearing surfaces of the guide rods and the peripheral edges of the helical screw flights are machined surfaces to provide even greater concentricity between the scroll and the screen, thereby further improving the performance of the centrifuge.

In another embodiment of the invention, a horizontal scroll screen centrifuge of the type generally described above has a fabricated scroll. The fabricated scroll has a tubular side wall with outer and inner ends adjacent respective open and closed ends of the basket. The fabricated scroll further has a plurality of helical screw flights attached to and extending outwardly from the tubular side wall. Each of the plurality of screw flights has an edge moving in close proximity and relative to an inner surface of the screen. An end plate is attached at the inner end of the tubular side wall to form a generally closed scroll end, and an infeed plate is attached circumferentially inside the tubular side wall intermediate the inner and outer ends. A fabricated scroll is used instead of the known cast scrolls; and further, machining the edges of the screw flights as described above permits the fabricated scroll to achieve a superior performance than centrifuges using known cast scrolls. In addition, the fabricated scroll weighs less and is easier to handle during a scroll changing process.

In a further embodiment of the invention, a horizontal scroll screen centrifuge of the type generally described above further has a scroll changing tool mounted to the housing to support the scroll during a screen changing process. The scroll changing tool has a base mounted to an upper side of a centrifuge housing, and an overarm support mounted on the base and extending forward of the housing. In one aspect of the invention, the overarm support is pivotally mounted in the base. Thus, the scroll can be removed from the centrifuge, the screen replaced and the scroll reinstalled in the centrifuge without the need for a crane or other device separate from the centrifuge.

These and other objects and advantages of the present invention will become more readily apparent during the following detailed description taken in conjunction with the drawings herein.

DETAILED DESCRIPTION OF THE INVENTION

Figure 1:
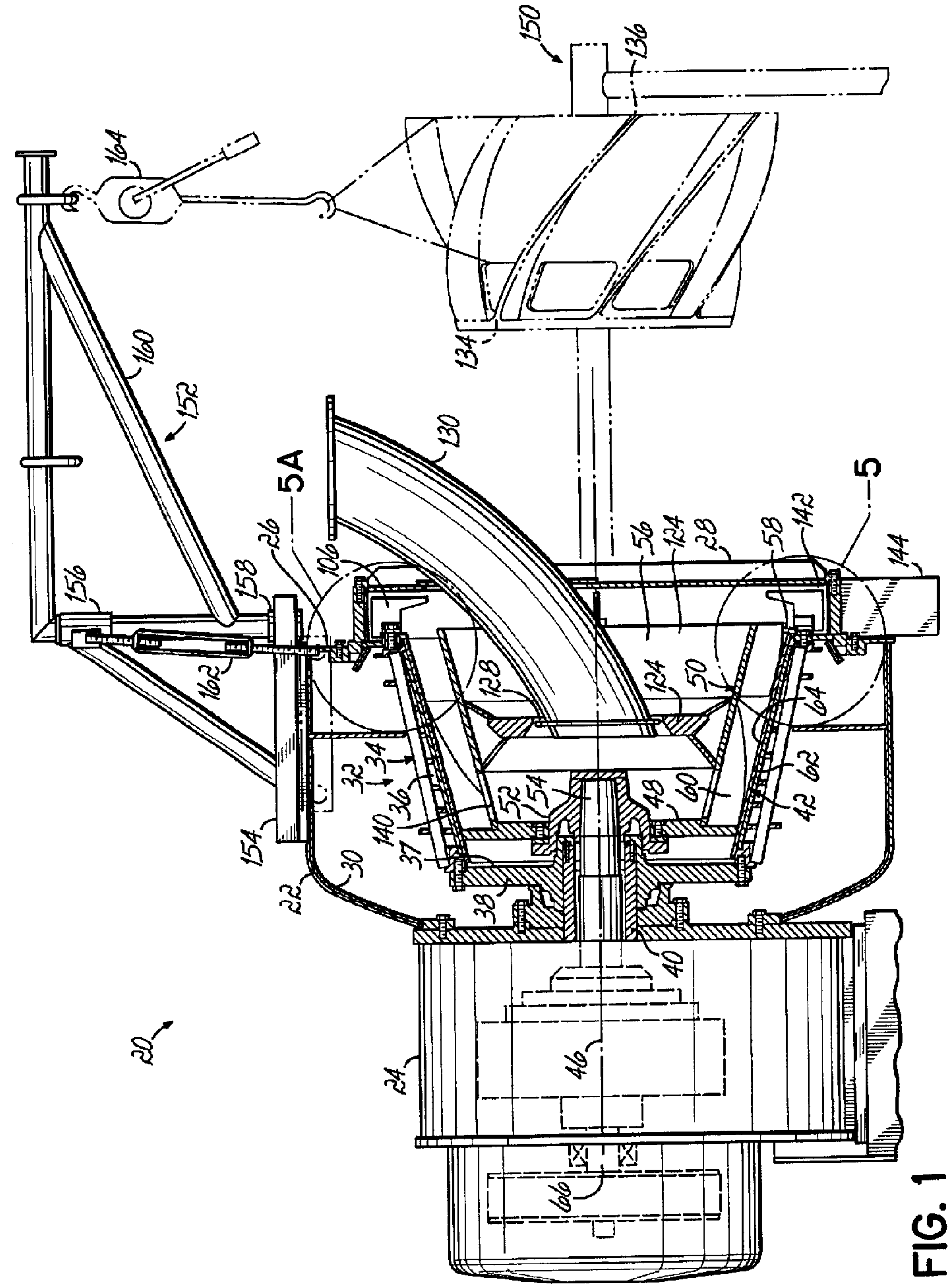
FIG. 1 is a partial cross-sectional view of a horizontal scroll screen centrifuge in accordance with the principles of the present invention.
Figure 2:
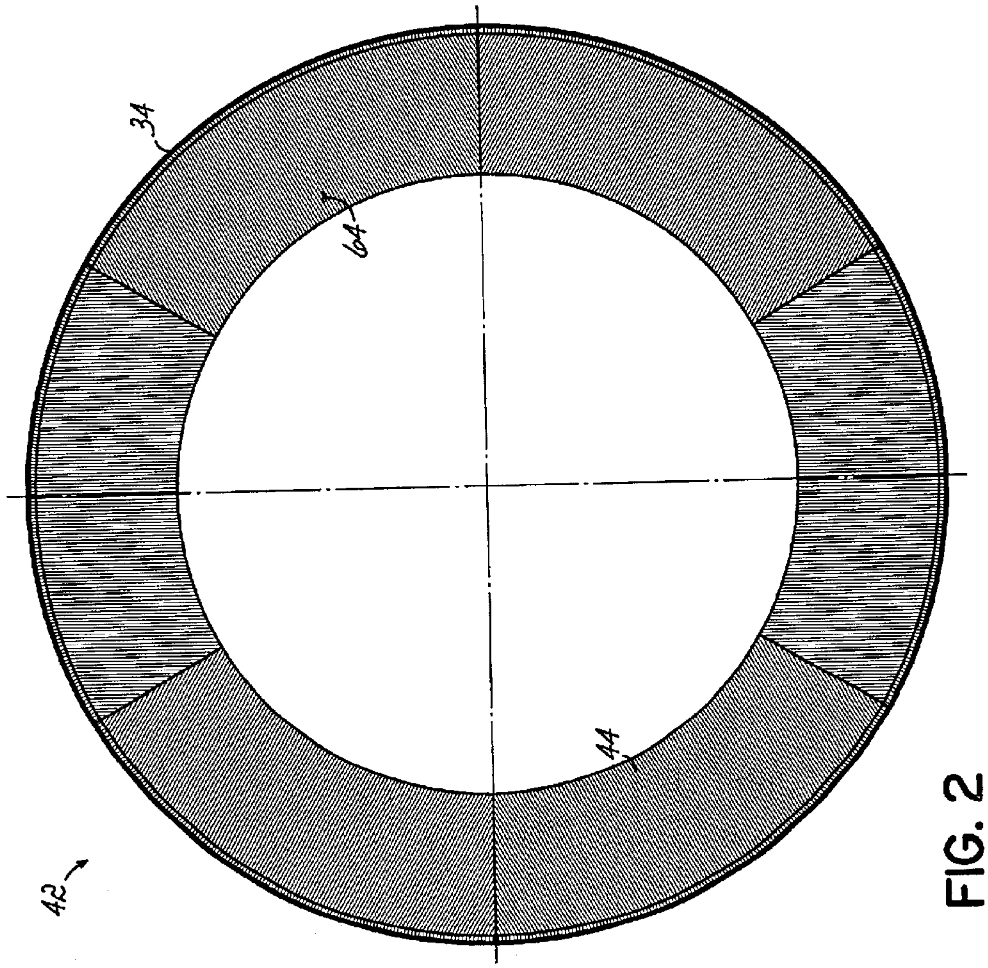
FIG. 2 is an end view of a screen used in the horizontal scroll screen centrifuge of FIG. 1.

Referring to FIG. 1, a horizontal centrifuge 20 has a discharge housing 22 that is mounted to a drive housing 24. The discharge housing 22 has a front wall 26 that includes a cover 28 that permits access to the interior of the centrifuge 20. Further, the drive housing 24 has an interior surface 30 bounding the contained volume of the discharge housing 22. A basket and scroll assembly 32 is rotatably mounted within the discharge housing 22. The basket and scroll assembly 32 is comprised of a basket 34 having a frustoconical shape, that is, the shape of a frustum or a truncated cone, and a plurality of slots 36. An inner, closed end 37 of the basket 34 has a hub 38 that is mechanically connected to the outer drive shaft 40. A peripheral screen 42 has a similar frustum shape that has slots or perforations 44 (FIG. 2) and is secured inside the basket 34. Thus, the assembly of the basket 34 and screen 42 is mounted to rotate within the discharge housing 22 about a generally horizontal axis of rotation 46.

An inner, closed end 48 of a scroll 50 has a hub 52 that is centrally located within the scroll 50 and is mechanically connected to an inner drive 54; and thus, the scroll 50 is also mounted to rotate within the discharge housing 22 about the axis of rotation 46. The scroll 50 also has a frustum shape and has an outer open end 56 adjacent an outer open end 58 of the basket 34. A plurality of screw flights 60 extend in a generally radial direction outwardly from the scroll 50, and the screw flights 60 extend helically relative to the axis of rotation 46 between the respective closed and open ends 48, 56 of the scroll 50. The screw flights 60 have respective peripheral edges 62, which, upon rotation of the scroll 50, move in close proximity to and relative to an inner surface 64 of the screen 42.

The centrifuge 20 is powered by a motor (not shown) that is mechanically coupled by a belt (not shown) to an input shaft 66 in a known manner. The input shaft 66 is connected via internal gearing to the inner and outer drive shafts 54, 40 to provide first and second rotary drives to the basket 34 and scroll 50, respectively, in a known manner. Thus, the outer and inner drive shafts 54, 40 rotate the scroll 50 and basket 34, respectively, at different angular velocities.

The effectiveness of the centrifuge 20 is determined in part by how much liquid is left in the solid material after the centrifuging process. The less liquid in the solid material, the more effective the centrifuge 20. A factor that controls the effectiveness of the separation process is the gap or space between the inner surface 64 of the screen 42 and the outer edges 62 of the helical screw flights 60. Further, that gap varies because the screen is often noncircular and less circular than the boundary defined by the screw flight outer edges 62. The noncircularity of the screen is caused in part by how the screen 42 is manufactured. Known screens are made by welding or otherwise connecting four screen segments, wherein each of the screen segments represents an axial or longitudinal quarter segment of the screen. The screen is fabricated by welding the four screen segments together, thereby producing four axially extending joints.

The welding or joining process often changes the radius of the screen segment near the joints, and therefore, those nonconstant, different radii cause the screen to lose circularity at the joints between the four segments. The net result is that the gap between the screen and the screw flight peripheral edges changes near the screen segment joints. To address that problem, referring to FIG. 2, the screen 42 is fabricated from six screen segments that are joined together to form the frustum shape of the screen. While there is still a loss of circularity at the welded joints between the six screen segments, the loss of circularity is substantially less than with the four segment screen. Therefore, with a six segment screen, the gap between the screen inner surface 64 and the screw flight peripheral edges 62 is less variable and more constant than with a four segment screen.

There are other factors that effect the circularity of the screen 42 and concentricity between the screen 42 and the screw flight peripheral edges 62. For example, known screens have a mounting flange that extends radially outward from the outer open end of the screen. That flange is mounted to the outer open end of the basket. Any irregularities in the squareness or other geometry of the screen flange or the outer ends of the basket or screen can result in the circularity of the screen and its concentricity with the basket being adversely affected in the process of mounting the screen to the basket with the flange. Therefore, the screen 42 is mounted differently than known screens.

Figure 4:
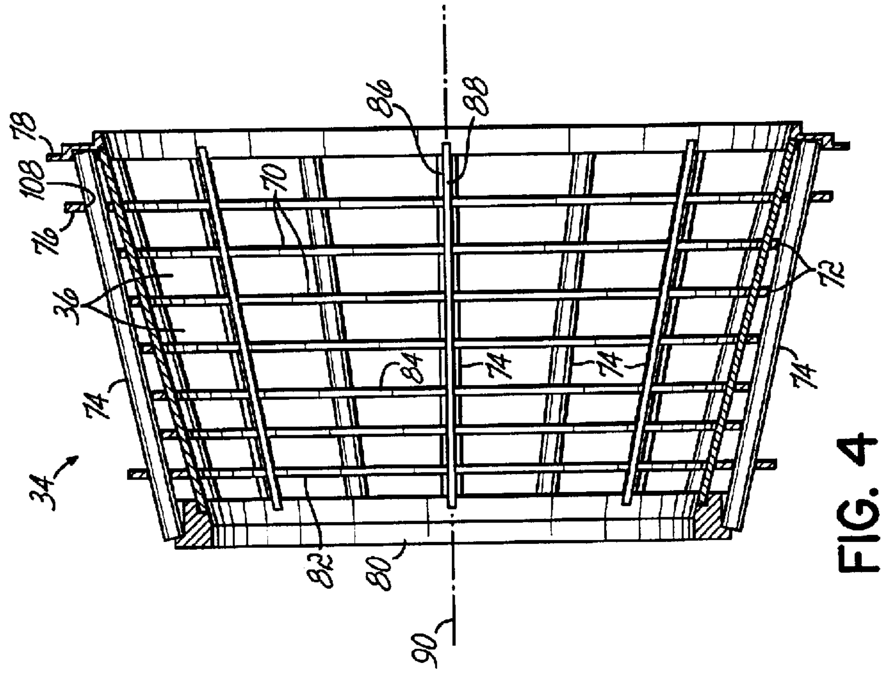
FIG. 4 is a cross-sectional view taken along line 4—4 of FIG. 3 of the basket used in the horizontal scroll screen centrifuge of FIG. 1.
Figure 3:
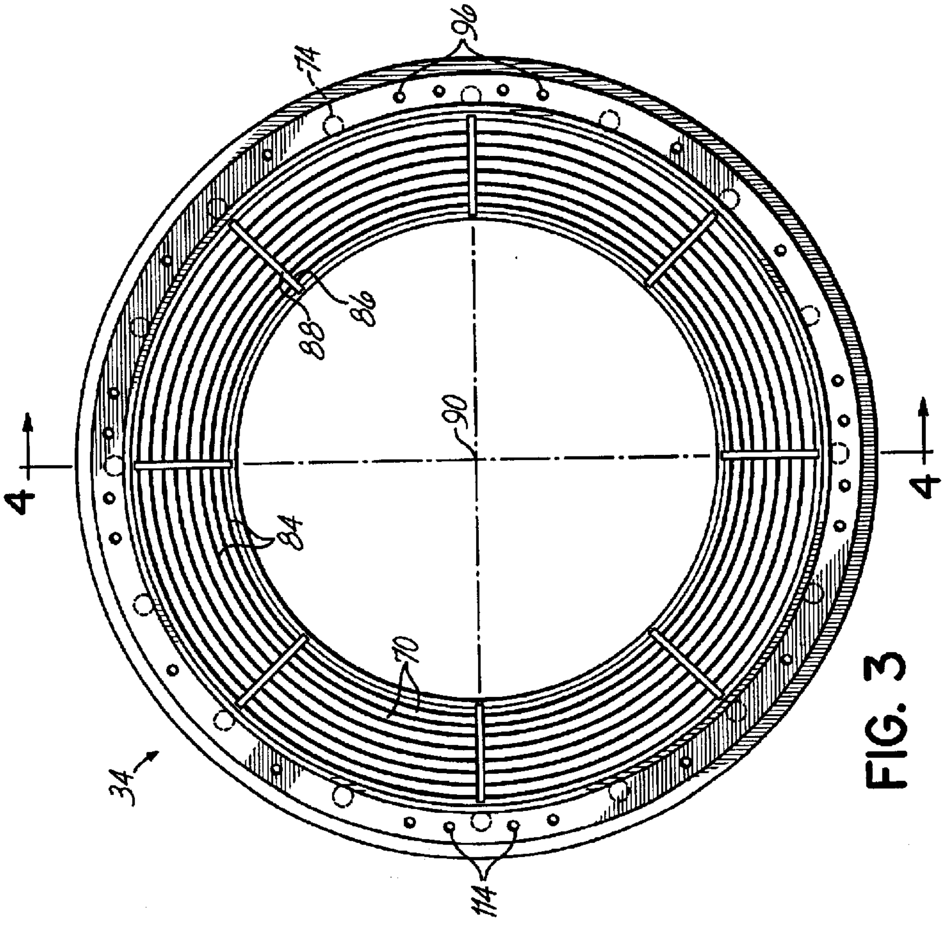
FIG. 3 is an end view of a basket used in the horizontal scroll screen centrifuge of FIG. 1.

Referring to FIGS. 3 and 4, the basket 34 is comprised of a plurality of annular plates or rings 70 that form the slots 36 therebetween. The rings 70 have notches (not shown) formed on respective outer circumferences 72 that are sized and shaped to receive axial rods 74, for example, lengths of circular bar stock. Outer rings 76, 78 of the rings 70 and inner rings 80, 82 of the rings 70 have peripheral through holes that are sized to receive the support rods 74 that extend therethrough. About 16 support rods 74 are substantially equally distributed about the outer circumferences 72 of respective rings 70. Inner circumferences 84 of respective rings 70 are notched to receive axially or longitudinally extending guide rails 86. About 8 guide rails 86 are substantially equally spaced about the inner circumferences 84 of respective rings 70 and connected thereto, for example, by welding.

The guide rails 86 have respective inner surfaces 88 that project outward from the inner circumferences 84 of the annular rings 72. Further, the bearing surfaces 88 are machined so that, first, they provide a locus of surfaces that form a frustum substantially identical to the frustum of the screen 42, and second, at any axial position, they form a locus of surfaces that is circular with respect to an axial centerline 90 of the basket 34. As the screen 42 is slid into the basket 34, the bearing surfaces 88 help guide the screen 42 into a concentric relationship with the basket 34. In addition, the application of an axial force against the outer end of the screen 42, for example, by a clamp ring or the retaining ring 92, helps to move the screen 42 into a contacting relationship with the bearing surfaces 88, thereby further contributing to the concentricity of the screen 42 with the basket 34.

Figure 5:
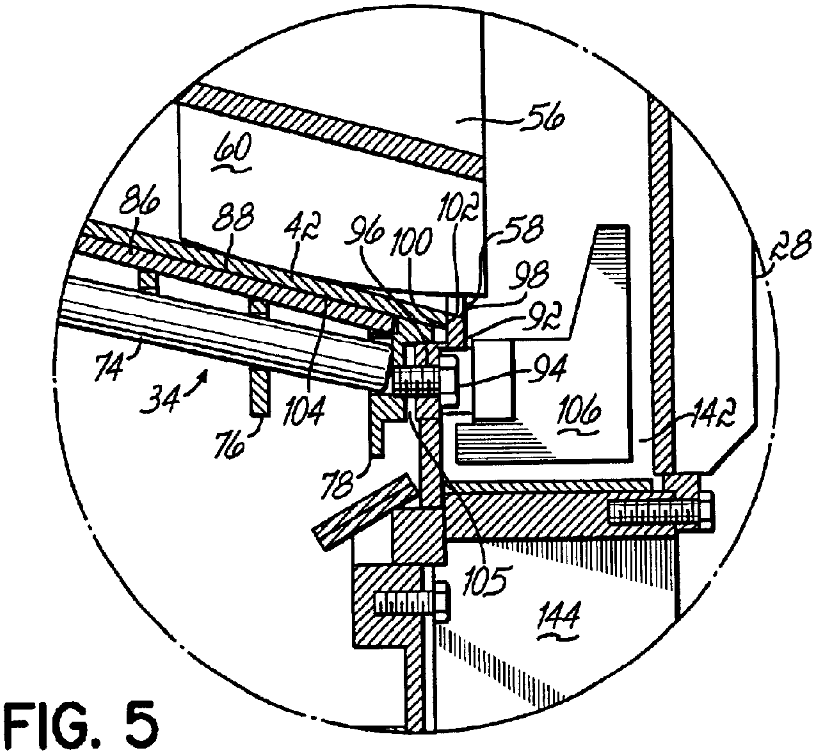
FIG. 5 is an enlarged view of the encircled portion 5 illustrating how the screen is secured in the horizontal scroll screen centrifuge of FIG. 1.
Figure 6:
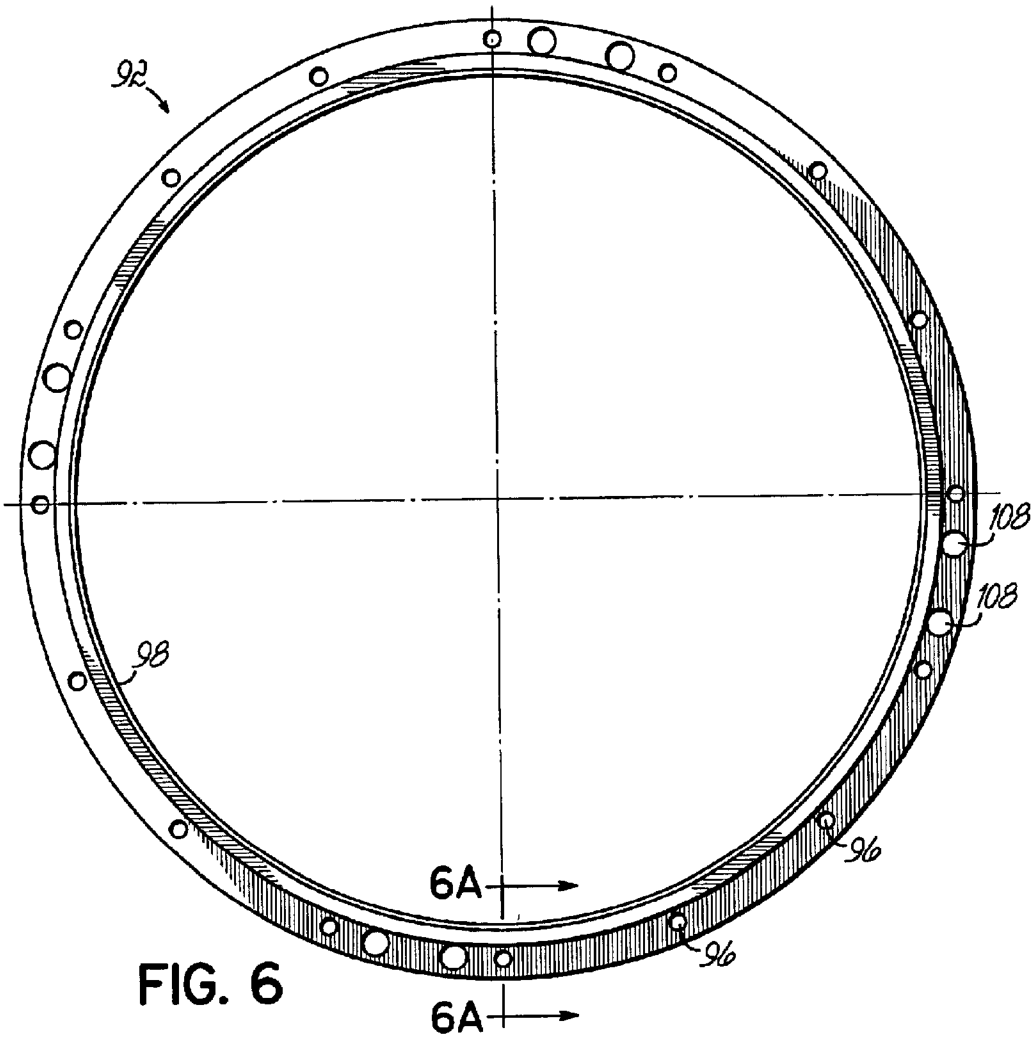
FIG. 6 is a plan view of the retaining ring used to secure the screen in the basket of the horizontal scroll screen centrifuge of FIG. 1.
Figure 6A:
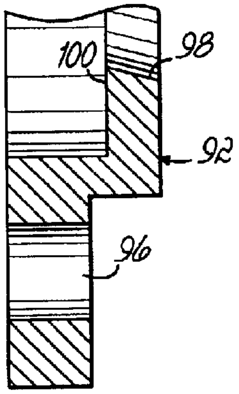
FIG. 6A is a cross-sectional view taken along line 6A—6A of FIG. 6 of the retaining ring used to secure the screen in the basket of the horizontal scroll screen centrifuge of FIG. 1.

Referring back to FIG. 1, the basket 34 is first placed in the discharge housing 22; and its hub 38 connected to the outer drive shaft 40. Thereafter, the screen 42 is slid inside the basket 34. The bearing surfaces 88 (FIG. 3) facilitate a concentric disposition of the screen 42 within the basket 34. Thereafter, referring to FIG. 5, a retaining ring 92, as detailed in FIGS. 6 and 6A, is attached to an outer end of the basket 34 by fasteners 94 extending through clearance holes 96 of the retaining ring 92 and engaging the outer end of the basket 34. The retaining ring 92 further has a radially directed inner lip 98 (FIGS. 5, 6A) with a bearing surface 100 in contact with the outer end 102 of the screen 42. Therefore, as the fasteners 94 are tightened, the retaining ring pushes axially against the screen outer end 102 to dispose the outer surface 104 of the screen firmly against the guide rail bearing surfaces 88, which maintains the roundness of the screen. Thus, the screen 42 has the greatest possible concentricity with respect to the basket 34. Thus, the tightening of the fasteners 94 is governed by the screen 42 contacting the bearing surfaces 88, and the retaining ring 92 is not tightened against the end of the basket 34. Normally, the retaining ring 92 is separated from the front of the basket by a gap 105.

It is also desirable that the screen 42 be as concentric as possible with the helical flight edges 62. Therefore, as will be further described later, the helical flight edges 62 are also machined such that they represent a locus of surfaces of a frustum that is substantially identical to the frustum formed by the locus bearing surfaces 88 of the basket 34.

Figure 5A:
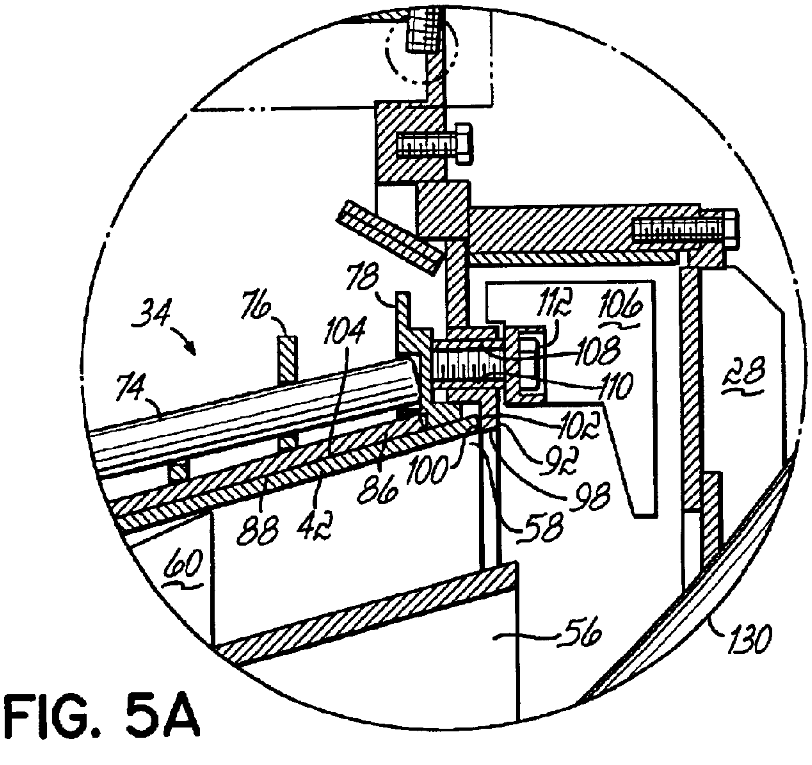
FIG. 5A is an enlarged view of the encircled portion 5A illustrating how the screen is secured in the horizontal scroll screen centrifuge of FIG. 1.

As shown in FIG. 1, four equally spaced paddles or wipers 106 are mounted to the outer end of the basket 34, so that they have an accurate and predictable position with respect to a raceway 142 adjacent the outer end of the basket 34. However, as earlier described, the retaining ring 92 is not tightened against the end of the basket 34 but its position is determined by the screen 42 contacting the bearing surfaces 88. Therefore, the paddles 106 must be mounted independent of the retaining ring 92. Referring to FIG. 5A, to facilitate that mounting, the retaining ring 92 has a plurality of clearance holes 108 (FIG. 6). Each paddle 106 is mounted on a pair of bushings 110 that extend through the clearance holes 108 of the retaining ring 92. A fastener 112 extends through holes in each of the paddles 106, through the pair of bushings 110 and into threaded holes 114 (FIG. 3) in the outer end of the basket 34. Therefore, the paddles 106 maintain the desired position with respect to the end of the basket 34 independent of the relationship of the retaining ring 92 to the basket 34.

Figure 7:
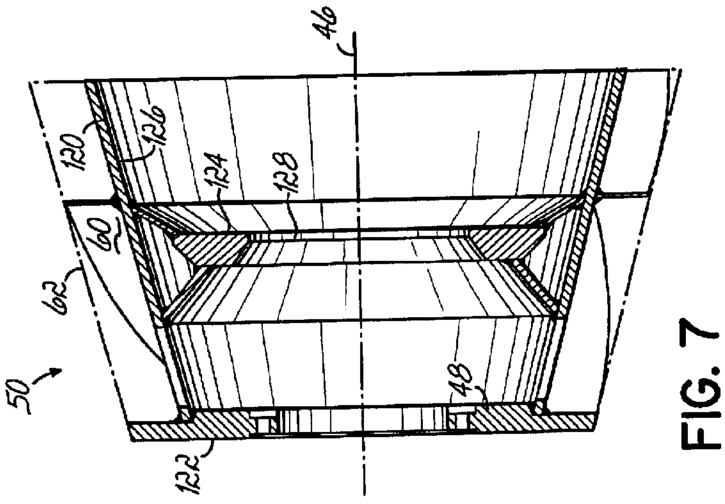
FIG. 7 is a centerline cross-sectional view of a scroll used in the horizontal scroll screen centrifuge of FIG. 1.
Figure 8:
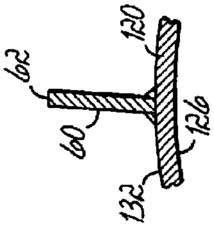
FIG. 8 is a cross-sectional view illustrating an attachment of a helical screw flight to the scroll of FIG. 7.

The centrifuge 20 differs from known centrifuges in that the scroll 50 of the centrifuge 20 is a fabricated part versus being a die cast part that is used with known centrifuges. Referring to FIG. 7, the scroll 50 has a tubular body 120 that has a frustum shape similar to the frustum shape of the basket 34. An end plate 122 is attached, for example, by welding, to one end of the tubular side wall 120, thereby forming a closed end 48 of the scroll 50. An infeed plate 124 is attached circumferentially, for example, by welding, to an inner surface 126 of the tubular side wall 120. The infeed plate 124 has an infeed opening 128 sized to receive a feed tube 130 (FIG. 1). Referring to FIG. 8, a plurality of helical screw flights 60 are attached, for example, by welding, to an outer surface 132 of the tubular side wall 120. There are eight helical screw flights 60 substantially equally spaced around the tubular side wall 120, and the helical screw flights 60 have a helical flight angle of about 60°. In other words, referring to FIG. 1, a radial inner edge 134 intersecting the axial centerline 46 is separated from a radial outer edge 136 by an angle of about 60°. The screw flight outer edges 62 are machined to have a size and shape such that they sweep through a frustum that is substantially identical in size and shape to the frustum formed by the guide rod bearing surfaces 88 (FIG. 3).

The post drilling oil mud is fed into the centrifuge 20 through a feed tube 130 to a wet end, or inner end, 48 of the scroll 50. Rotation of the scroll 50 moves oil mud through scroll feed openings 140 into a space between the helical screw flights 60. Centrifugal forces caused by the rotations of the scroll 50 and basket 34 push the oil mud against the screen 42 and the high degree of concentricity of the helical screw flights 60 relative to the screen 42 results in more liquid being moved through the screen 42 than if the helical screw flights 60 and screen 42 were less concentric. The liquid passes through the scroll 34 and is discharged from the housing 22 in a known manner. The solid material in the oil mud is carried by the helical screw flights 60 to the outer, open end 58 of the basket 34 and is discharged into an annular raceway 142. The raceway is lined with a ceramic tile in a known manner. Paddles 106 rotating with the basket 34 scrap the solid material off of the walls of the raceway 142 and into a solid material discharge chute 144.

The continuous operation of the centrifuge 20 results in wear on the screen 42, and it is expected that the screen must be periodically replaced. Changing the screen 42 requires removal of the scroll 50, which process normally uses a crane or overhead lifting device to support the scroll while the screen is being changed. However, as mentioned, on an oil rig platform, cranes are not available at the centrifuge location; and therefore, the scroll 50 must be supportable by other structure. Referring to FIG. 1, after the cover 28 has been removed, a mandrel and end support 150 (shown in phantom) are used to support the scroll 50 after it has been removed from the centrifuge 20. A scroll removal tool 152 is then used to support the scroll 50 during the remainder of the screen replacement process.

The scroll removal tool 152 has a base 154 that is bolted to the top of the housing 22. The base 154 supports a bushing 156 and a lower support 158, and an overarm 160 is rotatably mounted in the bushing 156 and lower support 158. The bushing 156 is laterally supported by two turnbuckles 162 that have respective upper ends connected to opposite sides of the bushing 156 and respective lower ends connected to the housing 22. After the scroll is pulled onto the mandrel 150, it is supported by a known lift device 164, for example, a "come-along", block and tackle, etc.; and the overarm 160 is rotated to provide access to the front of the centrifuge 20. The screen 42 is changed; and the above process is executed in reverse order to place the centrifuge back in service.

Thus, the horizontal screen scroll centrifuge 20 is suitable for use on a platform of an oil rig because of its relatively small footprint and very efficient in operation. Several structural improvements combine to provide greater concentricity between the scroll outer flights 62 and the screen 42, thereby improving the performance of the centrifuge 20. More specifically, the six segment screen 42 provides the screen with greater circularity and allows the screen to better conform to the bearing surfaces 88 on the guide rails 86, thereby making the screen 42 more concentric with the scroll outer edges 62. Further, the guide rod bearing surfaces 88 and the scroll outer edges 62 are machined surfaces to provide even greater concentricity between the scroll outer edges 62 and the screen 42. With the above, it is possible to fabricate the scroll 50, thereby providing a substantial reduction in cost over known cast scrolls. The above features provide a horizontal scroll screen centrifuge that is effective at separating the liquid from the solid material in an oil mud, thereby resulting in lesser volume of solid material that must be transported from the oil rig for proper disposal.

The horizontal screen scroll centrifuge 20 is further suitable for use on a platform of an oil rig because the centrifuge has a self-contained scroll changing tool 152 mounted to the housing 22, which is capable of supporting the scroll 50 during a screen changing process. Thus, the scroll 50 can be removed from the centrifuge 20, the screen 42 replaced and the scroll 50 reinstalled in the centrifuge 20 without the need for a crane or other device separate from the centrifuge.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, the horizontal scroll screen centrifuge 20 is described as being particularly well suited for use on a platform of an oil rig to separate liquid from solid material in oil mud. As will be appreciated, depending on the application, the various improvements discussed herein, for example, a six segment screen 42, guide rod bearing surfaces 88, machined guide rod bearing surfaces 88 and scroll helical flight edges 62, a fabricated scroll 50, etc., can be used together or in different combinations.

Therefore, the invention in its broadest aspects is not limited to the specific details shown and described. Consequently, departures may be made from the details described herein without departing from the spirit and scope of the claims which follow.

What is claimed is:

1. A horizontal centrifuge comprising:

a housing;

a basket having an outer open end and an inner closed end and mounted within the housing to rotate about an axis of rotation;

a plurality of rings disposed between the open and closed ends of the basket;

a plurality of guide rails circumferentially spaced with respect to the rings and having respective lengths extending between the open and the closed ends of the basket, the guide rails providing a plurality of bearing surfaces;

a tubular screen having inner and outer surfaces terminating with opposed open ends, the tubular screen being supported inside the basket by the plurality of bearing surfaces;

a scroll mounted within the basket to rotate about the axis of rotation, the scroll having open and closed ends adjacent the respective open and closed ends of the basket; and an infeed tube having an outlet extending into the outer end of the scroll.

2. The horizontal centrifuge of claim 1 wherein the basket further comprises:

a ring mounted to the basket to force the screen against the bearing surfaces to maintain the roundness of the screen.

3. The horizontal centrifuge of claim 1 wherein the plurality of bearing surfaces are machined surfaces equally spaced from an axial centerline of the basket.

4. The horizontal centrifuge of claim 3 wherein the scroll further comprises a plurality of helical screw flights having respective machined end surfaces equally spaced from an axial centerline of the scroll and moving in close proximity and relative to the inner surface of the screen.

5. A horizontal centrifuge comprising:

a housing;

a basket having an open outer end and an inner closed end and mounted within the housing to rotate about an axis of rotation;

a tubular screen having inner and outer surfaces terminating with opposed inner and outer ends, the tubular screen being mounted inside the basket with the outer surface adjacent the basket;

a retaining ring mounted to the outer end of the basket, the retaining ring contacting the outer end of the tubular screen to retain the tubular screen inside the basket;

a scroll mounted within the basket to rotate about the axis of rotation, the scroll having open and closed ends adjacent the respective open and closed ends of the basket; and an infeed tube having an outlet extending into the outer end of the scroll.

6. The horizontal centrifuge of claim 5 wherein the retaining ring comprises an annular retaining flange extending radially inward and contacting the outer end of the tubular screen.

7. The horizontal centrifuge of claim 5 wherein the outer end of the tubular screen comprises a flangeless edge.

8. The horizontal centrifuge of claim 5 further comprising:

a hole in the retaining ring;

a bushing having one end extending through the hole in the retaining ring and bearing against an outer end of the basket; and a paddle disposed adjacent the bushing and extending outward from the basket into the housing, the paddle being mounted to the outer end of the basket with the bushing.

9. The horizontal centrifuge of claim 5 further comprising a plurality of holes in the retaining ring;

a plurality of bushings, each of the plurality of bushings having an inner end extending through a different hole in the retaining ring; and a plurality of paddles, each of the plurality of paddles being disposed adjacent a different bushing and extending outward from the basket into the housing and each of the paddles being mounted to the outer end of the basket with a respective bushing.

10. The horizontal centrifuge of claim 9 wherein the plurality of holes, the plurality of bushings and the plurality of paddles is substantially equally spaced around the outer end of the basket.

11. The horizontal centrifuge of claim 10 wherein there are four paddles.

12. The horizontal centrifuge of claim 11 further comprising two fasteners for connecting each of the four paddles to the outer end of the basket, each of the two fasteners extending through a respective bushing that, in turn, extends through a respective hole in the ring, each of the two fasteners being attached to the outer end of the basket.

13. A horizontal centrifuge comprising:

a housing;

a basket having an outer open end and an inner closed end and mounted within the housing to rotate about an axis of rotation;

a tubular screen having inner and outer surfaces terminating with opposed open ends, the tubular screen being mounted inside the basket with the outer surface adjacent the basket, the tubular screen comprising six arcuate screen segments joined together;

a scroll mounted within the basket to rotate about the axis of rotation, the scroll having open and closed ends adjacent the respective open and closed ends of the basket; and an infeed tube having an outlet extending into the outer end of the scroll.

14. A horizontal centrifuge comprising:

a housing;

a basket having an open outer end and an inner closed end and mounted within the housing to rotate about an axis of rotation;

a tubular screen having inner and outer surfaces terminating with opposed ends, the tubular screen being mounted inside the basket with the outer surface adjacent the basket;

a fabricated scroll mounted within the basket to rotate about the axis of rotation relative to the basket, the scroll comprising a tubular side wall with outer and inner ends adjacent the respective open and closed ends of the basket, the tubular side wall having a plurality of feed openings proximate the rear end, a plurality of helical screw flights attached to and extending outwardly from the tubular side wall between the outer and inner ends of the scroll, each of the plurality of screw flights having respective machined end surfaces equally spaced from an axial centerline of the scroll and moving in close proximity and relative to the inner surface of the screen, an end plate attached at the inner end of the tubular side wall to form a generally closed scroll end adjacent the closed end of the basket, and an infeed plate attached circumferentially inside the tubular side wall intermediate the front end and the rear end; and an infeed tube having an outlet extending through the infeed plate.

15. The horizontal centrifuge of claim 14 wherein the plurality of helical screw flights comprises eight helical screw flights.

16. The horizontal centrifuge of claim 15 wherein each of the helical screw flights has a flight angle of about 60°.

17. The horizontal centrifuge of claim 16 wherein the eight flights are substantially equally spaced about the tubular side wall.

18. The horizontal centrifuge of claim 14 wherein the basket, tubular screen and tubular side wall have a frustum shape.

19. A horizontal centrifuge comprising:

a housing;

a basket having an open outer end and an inner closed end and mounted within the housing to rotate about an axis of rotation, a tubular screen having inner and outer surfaces terminating with opposed ends, the tubular screen being mounted inside the basket with the outer surface adjacent the basket;

a scroll mounted within the basket to rotate about the axis of rotation, the scroll having open and closed ends adjacent the respective open and closed ends of the basket;

an infeed tube having an outlet extending into the outer end of the scroll; and a scroll changing tool mounted to the housing and supporting the scroll during a process of inserting and removing the scroll from the housing.

20. The horizontal centrifuge of claim 19 wherein the scroll changing tool comprises:

a base mounted to an upper side of the housing; and an overarm support mounted on the base and extending forward of the housing.

21. The horizontal centrifuge of claim 20 wherein the overarm support is rotatably mounted on the base to pivot with respect to a substantially vertical axis of rotation.

22. A horizontal centrifuge comprising:

a housing;

a basket having an outer open end and an inner closed end and mounted within the housing to rotate about an axis of rotation, the basket further comprising a plurality of bearing surfaces;

a tubular screen comprising six arcuate screen segments joined together and having inner and outer surfaces terminating with opposed open ends, the tubular screen being supported inside the basket by the plurality of bearing surfaces;

a retaining ring mounted to the outer end of the basket, the retaining ring contacting the outer end of the tubular screen to retain the tubular screen inside the basket;

a scroll mounted within the basket to rotate about the axis of rotation, the scroll having open and closed ends adjacent the respective open and closed ends of the basket; and an infeed tube having an outlet extending into the outer end of the scroll.

23. The horizontal centrifuge of claim 22 wherein the plurality of bearing surfaces are machined surfaces equally spaced from an axial centerline of the basket.

24. The horizontal centrifuge of claim 23 wherein the scroll further comprises a plurality of helical screw flights having respective machined end surfaces equally spaced from an axial centerline of the scroll and moving in close proximity and relative to the inner surface of the screen.

25. The horizontal centrifuge of claim 24 further comprising a scroll changing tool mounted to the housing and supporting the scroll during a process of inserting and removing the scroll from the housing.

26. The horizontal centrifuge of claim 25 wherein the retainer ring is mounted to urge the screen against the bearing surfaces to maintain the roundness of the screen.

* * * * *